Figure 1:
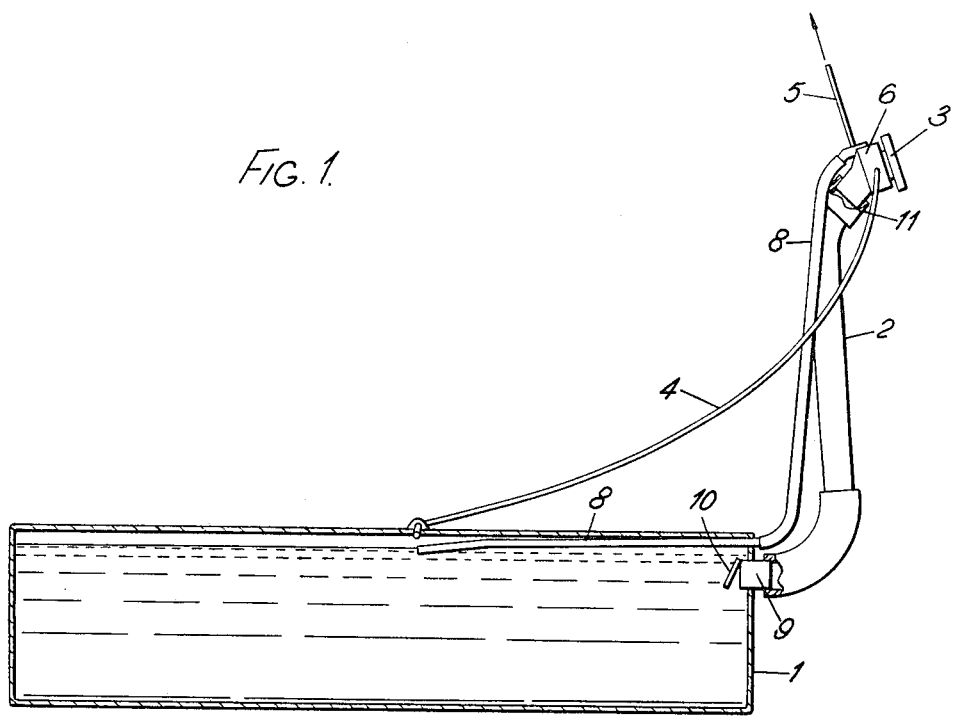

United States Patent [19]

Brunnert

[11] 4,044,913
[45] Aug. 30, 1977

[54] VALVE MECHANISMS

[75] Inventor: Stig Erik Brunnert, Vanersborg, Sweden

[73] Assignee: Saab-Scania AB, Sodertalje, Sweden

[21] Appl. No.: 659,341

[22] Filed: Feb. 19, 1976

[30] Foreign Application Priority Data

Feb. 21, 1975 Sweden .................. 7501957

[51] Int. Cl.² ........................................... B65D 25/00
[52] U.S. Cl. .................................. 220/86 R; 141/326; 251/303
[58] Field of Search ................. 137/527, 855; 251/149.2, 303; 220/86 R; 141/301, 325, 326

[56] References Cited

U.S. PATENT DOCUMENTS

| 2,346,313 | 4/1944 | Keller | 770/86 R |
| 2,637,513 | 5/1953 | Wallen | 220/86 R |
| 3,394,842 | 7/1968 | Randolph et al. | 220/86 R |

FOREIGN PATENT DOCUMENTS

| 132,429 | 5/1899 | Germany | 137/855 |
| 350,304 | 2/1973 | Sweden | 220/86 R |
| 16,483 | 7/1907 | United Kingdom | 137/855 |
| 18,175 | 8/1906 | United Kingdom | 137/855 |

Primary Examiner—William Price
Assistant Examiner—Allan N. Shoap
Attorney, Agent, or Firm—Schiller & Pandiscio

[57] ABSTRACT

The invention relates to a valve mechanism for a liquid container, particularly a petrol tank of the kind in which an air-ventilating line between the tank and its filling pipe is closed during filling to build up an air pocket for limiting the filling level. The invention provides a simple construction in which the ventilating line opens into a recess formed in the wall of the filling pipe near to the filler cup. The opening is normally closed during filling by a seal carried by a spring retained in the recess, the spring having a part extending into the filling pipe such that, when fitted, an axial extension of the filler cap urges the spring, and hence the seal, to uncover the opening. In a preferred form, the recess extends transversely of the filling pipe and the spring is U-shaped and contained within the recess, that leg nearer the filler cap carrying the seal.

8 Claims, 2 Drawing Figures

U.S. Patent

Aug. 30, 1977

4,044,913

VALVE MECHANISMS

The present invention relates to a valve mechanism, and more particularly to a valve mechanism for co-operation with the filling pipe of a liquid-container having at least one air-ventilating line which opens into the filling pipe adjacent one end thereof, which end is closable by means of a cap.

It is known to use such valve mechanisms with the filling pipes of vehicle fuel tanks, in which the valve mechanism is arranged to hold the connection to the air-ventilating line closed between the fuel tank and the filling pipe during a tank-filling operation. As a result of this, an air pocket is formed in the upper portion of the fuel tank which ensures that the tank can only be filled to a pre-determined level. For the purpose of controlling the valve mechanism, the cap of the filling line is so constructed that when placed on the end of the filling pipe to seal said end, the valve mechanism is caused to open the air-ventilating connection, whereupon fuel in the filling pipe can flow to the fuel tank.

Such a valve mechanism is described in Swedish Pat. Specification No. 350304. The known valve mechanism comprises a large number of elements which complicate the valve mechanism and render it expensive to produce and also cause the valve mechanism to be sensitive to disturbances in operation.

An object of the present invention is to at least substantially reduce the aforementioned disadvantages encountered with the known valve mechanism.

A further object of the invention is to provide a simplified valve mechanism for opening and closing the air-ventilating connection between a liquid-container and a filling pipe associated therewith.

According to the invention the valve mechanism is mainly characterized by the fact that the air-ventilating line opens into a recess arranged in the inner cylindrical surface of the filling pipe; a plate spring or the like is tensioned in said recess so as to sealingly close the connection to the air-ventilating line; and a cap arranged to seal the upper end of the filling pipe is provided with an axially extending sleeve-extension or the like which, when the cap is applied to the end of the filling pipe, engages the same and causes the plate spring to open the connection to the air-ventilating line.

So that the invention will be more readily understood and further features thereof made apparent, an exemplary embodiment of a valve mechanism according to the invention will now be described with reference to the accompanying drawings, in which -

Figure 2:
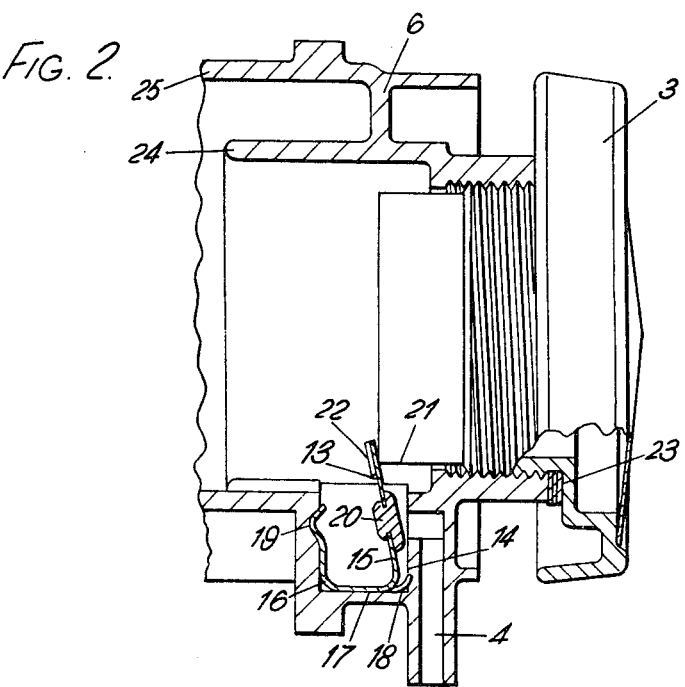

FIG. 1 shows diagrammatically the fuel tank of a motor vehicle and a system of pipes co-operating with said fuel tank, and, FIG. 2 is a diagrammatic longitudinal sectional view of an upper end portion of a fuel-tank filling pipe.

Referring to FIG. 1, there is shown a fuel tank 1 for use with a motor vehicle (not shown). The fuel tank 1 is of parallelepipedic configuration and is provided with a filling pipe 2 which opens into the fuel tank 1 through an end wall or long side thereof. An outlet 9 of the pipe 2 into the fuel tank 1 can be closed by means of an inwardly/outwardly operating rocker flap 10.

The filling pipe 2 conveniently comprises a plurality of parts which are held resiliently and sealingly together by means of sleeves 11 made of a suitable material. The upper end 6 of the filling pipe 2 is arranged in a conventional manner to open out on either one side or the other of the vehicle and a cap 3 is provided by means of which said end 6 can be sealed. Extending from the upper portion of the fuel tank 1 to the end portion 6 of the pipe 2 is a first air-ventilating line 4, the upper end of which opens into the upper end portion 6 of the filling pipe 2 through a valve. Also extending between the fuel tank 1 and the upper end portion 6 of the filling pipe is an evacuation pipe 8.

The upper end portion 6 of the filling pipe 2 also communicates, through a second air-ventilating line 5, with a filter (not shown) arranged in the engine compartment of the vehicle, from which filter a line extends to the suction system of the engine. The air-ventilating line 5 and elements associated therewith are incorporated in a system arranged to prevent fuel vapour from passing to atmosphere, and since they have no close connection with the present invention they will not be further described.

As shown in FIG. 2, the valve comprises a substantially U-shaped double-folded plate spring 13 which is mounted in an internal recess 14 in the upper end portion 6 of the filling pipe. The recess 14 has a substantially parallelepipedic configuration. The spring 13 has two legs 15, 16 and a web 17 connecting said legs, said legs and said web being arranged to be tensioned against the walls of the recess, located transversely of the longitudinal axis of the filling pipe, and the bottom wall of said recess. Hereinafter the leg, wall or the like nearest the opening of the filling pipe is referred to as the upper leg, wall or the like and, in a corresponding way, the other leg, wall or the like is referred to as the lower leg, wall or the like. The width of the upper leg 15 is smaller than the width of the lower leg 16 and of the web 17. At the edges of the upper leg 15, the web 17 is provided with slightly bent tongues 18 by means of slots, said tongues extending externally of the U-profile and engaging in a transverse groove in the upper wall of the recess 14. Arranged on the lower leg 16 of the plate spring 13 is a bulge 19 which co-acts with a corresponding curved recess in the lower wall of the recess 14, the tongues 18 together with the bulged portion 19 providing for a reliable mounting of the spring 13 in the recess 14. The bends of the tongues 18 differ from the bend between the web 17 and the upper leg 15 with respect to the radii of the bends and the position of the bends. The bend of the tongues 18 is effected at a greater distance from the centre of the web 17 and at a much greater radii than with the bend between the upper leg 15 and the web 17. This latter bend is arranged to provide for parallel-insertion between the upper leg 15 of the plate spring 13 and the upper wall of the recess 14. Because of this bending method, the spring 13 obtains a form which facilitates its mounting in the recess 14.

The upper leg 15 is provided with a hole in which a rubber plug 20 is mounted. The upper side of the rubber plug 20 serves as a seal against the opening of the air-ventilating line 4 in the recess 14. The upper leg 15 extends into the filling pipe 2 and is arranged to be actuated by an inwardly extending tubular portion 21 formed on the cap 3. To eliminate the risk of hooking between the pipe piece 21 and the leg 15, the latter is provided towards its upper end with edge portions 22 which are bent outwardly from the plane of the upper leg.

The cap 3 is arranged to be screwed in a known manner onto the end portion 6 of the filling pipe and to seal against the end edge of said end portion 6 by means of a sealing ring 23. The upper end 6 of the filling pipe is provided with an inner pipe piece 24 of smaller diameter than the outer pipe piece 25 connected to the filling pipe 2, which extends to the fuel tank 1. The inner pipe piece 24 reduces the tendency of fuel to splash outwardly during a tank filling operation.

When filling the fuel tank, the cap 3 is removed. With the cap removed, the upper leg 15 of the plate spring 13 urges the rubber plug 20 into resilient abutment with the opening of the air-ventilating line 4, whereupon the ventilating valve is closed. During a fuelling operation, air initially present in the fuel tank 1 is able to pass out through the evacuation pipe 8, although when the fuel rises to a level above the mouth of the evacuation pipe, the air can no longer escape and the fuel will therefore rise in the filling pipe 2 to a level at which fuelling is interrupted. When the cap 3 is subsequently screwed onto the end portion 6, the tubular portion 21 of the cap 3 will force the end portion of the upper leg 15 to one side, whereupon the valve opens due to the fact that the rubber plug 20 is forced away from the mouth of the air ventilating line 4. Opening of the valve enables the air trapped in the tank 1 to escape and to be forced out through the ventilating line 4 so that a common fuel level is obtained in the fuel tank 1 and the filling pipe 2.

The valve mechanism according to the present invention is not limited to the described embodiment, but can be modified within the scope of the accompanying claims. For example, the plate spring and the recess may have other co-operating geometrical shapes than parallelepipedic shapes. Alternatively, the plate spring can be made substantially planer and clamped between two wall portions when mounting the upper end portion 6.

I claim:

1. In a container for holding a liquid, a filling pipe having an inlet which is closable by a removable cap and an outlet disposed in said container, at least one air-ventilating line which opens into an internal recess defined in the inner surface of the filling pipe adjacent the filling pipe inlet end, and a valve mechanism for said air-ventilating line, the improvement which comprises, said recess being of parallelepipedic configuration and extending transversely of said filling pipe with said air-ventilating line opening in an axial wall of said recess, a spring comprising a double-bent U-shaped plate spring having two legs and a web portion connecting said legs mounted in said filling pipe and tensioned against the walls of said recess so that its legs are spaced apart in the longitudinal direction of said filling pipe, said plate spring having a part thereof extending into the through-passage of said filling pipe, a seal carried by said plate spring and arranged to close the connection to the air-ventilating line, and an axial sleeve extension provided on said cap arranged, when said cap is mounted on said filling pipe, to engage and urge said plate spring, via its extension, in a manner to cause the connection to the airventilating line to be opened.

2. A valve mechanism according to claim 1, wherein the leg located nearest the inlet end of the filling pipe extends into the through-passage of the filling pipe, and wherein the other leg has a transverse bulge for co-operating with a corresponding curved surface in the corresponding wall of said recess.

3. A valve mechanism according to claim 2, wherein the web of the U-shaped plate spring is provided with tongues which extend externally of the U-shaped profile of the plate spring adjacent the edges of said one leg to engage within a transverse groove in that wall of said recess against which said one leg bears.

4. A valve mechanism according to claim 2, wherein that part of said one leg which extends into the through-passage of the filling pipe is at least partially formed with edges bent outwardly from the plane of said leg.

5. A fuel tank for a motor vehicle, comprising, in combination:
a container adapted to hold a supply of fuel,
a filling pipe having an inlet which is closeable by a removable cap, and an outlet disposed in said container,
at least one air-ventilating line having an inlet disposed in said container and an outlet disposed in an internal recess defined in the inner surface of said filling pipe adjacent the filling pipe inlet end, said recess being of parallelepipedic configuration, said air-ventilating pipe opening in an axial wall of said recess, said recess extending transversely of the filling pipe,
a spring comprising a double-bent U-shaped plate spring having two legs and a web portion connecting said legs mounted in the filling pipe tensioned against the walls of said recess so that its legs are spaced apart in the longitudinal direction of said filling pipe, said plate spring extending for a distance into the through-passage of said filling pipe,
a seal carried by said plate spring and arranged to close said air-ventilating line outlet, and a removable cap for mounting on said filling pipe inlet, said cap having an axial sleeve extension which is adapted to contact the extension on said plate spring when said cap is mounted on said filling pipe inlet to thereby cause the seal on said air-ventilating line to open.

6. A valve mechanism according to claim 5, wherein the leg located nearest the inlet end of the filling pipe extends into the through-passage of the filling pipe, and wherein the other leg has a transverse bulge for cooperating with a corresponding curved surface in the corresponding wall of said recess.

7. A valve mechanism according to claim 6, wherein the web of the U-shaped plate spring is provided with tongues which extend externally of the U-shaped profile of the plate spring adjacent the edges of said one leg to engage within a transverse groove in that wall of said recess against which said one leg bears.

8. A valve mechanism according to claim 6, wherein that part of said one leg which extends into the through-passage of the filling pipe is at least partially formed with edges bent outwardly from the plane of said leg.

* * * * *

UNITED STATES PATENT OFFICE
CERTIFICATE OF CORRECTION

PATENT NO. : 4044913
DATED : August 30, 1977
INVENTOR(S) : Stig Erik Brunnert

It is certified that error appears in the above-identified patent and that said Letters Patent are hereby corrected as shown below:

Column 4, line 43: The term "fuel tank" should be substituted for "valve mechanism".

Column 4, line 49: The term "fuel tank" should be substituted for "valve mechanism".

Column 4, line 55: The term "fuel tank" should be substituted for "valve mechanism".

Signed and Sealed this

Thirteenth Day of December 1977

[SEAL]

Attest:

RUTH C. MASON
Attesting Officer

LUTRELLE F. PARKER
Acting Commissioner of Patents and Trademarks